United States Patent [19]

Hennel

[11] Patent Number: 4,844,334
[45] Date of Patent: Jul. 4, 1989

[54] METHOD OF SETTING THE OUTPUT OF A PUMP

[76] Inventor: Ewald Hennel, Mecklenheidestrasse 61, D-3000 Hannover 21, Fed. Rep. of Germany

[21] Appl. No.: 147,945

[22] Filed: Jan. 25, 1988

[30] Foreign Application Priority Data

Jan. 29, 1987 [DE] Fed. Rep. of Germany ....... 3702569

[51] Int. Cl.$^4$ ............................................... F24D 3/00
[52] U.S. Cl. ...................................... 237/8 R; 417/45
[58] Field of Search ................... 237/8 R, 8 C; 417/45

[56] References Cited

U.S. PATENT DOCUMENTS 4,708,594 11/1987 Shinmei et al. ........................ 417/45

FOREIGN PATENT DOCUMENTS 3508049 9/1986 Fed. Rep. of Germany .

*Primary Examiner*—Henry A. Bennet
*Attorney, Agent, or Firm*—Spencer & Frank

[57] ABSTRACT

Method of setting the output of a circulating pump installed in a hot water heating system and drivable by a variable rpm electromotor, including driving water by the pump from a water heater through a piping system to consumer devices situated in various locations served by the heating system, returning the water to the water heater by way of a return pipe, sensing the flow velocity of the water by a measuring device installed in the piping system, obtaining from the measuring device an electric voltage proportionate to the flow velocity, applying the voltage to a regulator which regulates the electromotor of the pump, generating output voltage values by the regulator, at least in lower voltage ranges, which are, up to 60% of a maximum voltage, higher than those voltage values which correspond to a characteristic curve of the circulating pump, and steplessly varying the rpm of the electromotor as a function of the output voltage of the regulator.

8 Claims, 2 Drawing Sheets

METHOD OF SETTING THE OUTPUT OF A PUMP

BACKGROUND OF THE INVENTION

This invention relates to a method of setting the output of a circulating pump which is driven by an rpm-variable electromotor and which is installed in a hot water heating system. The pump is utilized to pump water from a water heater through consumer apparatus situated in different rooms served by the heating system and to return the water through a return pipe to the water heater. At a designated location of the pipe system a measuring device is mounted which determines the flow velocity of the water and which emits an electric signal that is proportionate to the flow velocity. The electric signal is then transmitted to a regulator associated with the electric motor that drives the pump whereupon the regulator varies the rpm of the electromotor dependent upon the signal obtained from the measuring device. A system of this type is disclosed, for example, in German Offenlegungsschrift (Non-examined Published Application) No. 3,508,049.

Heating systems are available in a great number of sizes. They are installed, for example, in single family homes, in rental buildings, in large office buildings or in multi-building complexes. The required pump output to service a particular system is directly dependent upon the size of the heating system. The size is determined essentially by the number of consumer apparatus employed in the system. Thus, in many instances a single circulating pump suffices. In larger installations there is one main pump and additional pumps provided for the individual heating circuits. The maximum output of the pump of a particular heating system is determined by that rate required to sufficiently supply all consumers in that system, when all consumers are requiring a maximum amount of heating medium. It will be understood that by "consumer apparatus" it is meant, for example, heating bodies, flat heaters, heat exchangers or the like.

A full pump output is needed only when all consumer apparatus or at least a significant part thereof, are receiving the fluid medium. In periods—for example, at night or in warmer seasons—where only one part of the consumer apparatus is active, the pump output may be reduced. This also applies to situations when the requirement of consumer apparatus is, for example, throttled by thermostatic valves. If the pump continues its delivery in such cases with full output, it may cause flow noises in the pipe system. Further, in this instance the pump unnecessarily consumes the maximum energy which involves waste and unnecessary costs.

There are therefore commercially available circulating pumps whose electromotor may be driven in stages at different rpm's. The switching from one rpm to another may be effected by appropriate switches either manually or automatically by means of a timer such as a timing clock. In both instances the switchover is effected in a time-dependent manner, based on test data. An adaptation to the actually required output is not feasible with such prior art arrangement. Thus, in such prior art methods or installations it cannot be determined at what time, during the peak load periods, a larger number of consumer apparatus are switched off or at what time, during the period of reduced pump output, a greater number of consumer apparatus are switched on. Particularly, the latter situation may have the adverse effect that the heat requirement as a whole cannot be satisfied.

With the process disclosed in the German Offenlegungsshrift No. 3,508,049 there may be ensured an automatic adaptation of the pump output to the momentary operational conditions. In the process disclosed in this patent the pump output is varied as a function of the flow velocity of the water in the return pipe. For driving the circulation pump an electromotor is used which can be switched over to at least two different rpm's in a stewise manner. Such a process has been found workable in practice. However, the switchover operation to the different rpm stages requires a relatively complex switching system and furthermore, in the above-mentioned method, a continuous adaptation of the pump output of the circulating pump is not possible.

SUMMARY OF THE INVENTION

It is an object of the invention to provide an improved method of the above-mentioned type with which a continuous adaptation of the output of the circulating pump associated with a heating system may be possible, with the use of simple switching technology and further, a sufficient supply of all consumer apparatus of the heating system in all operational conditions, is ensured.

This object and others to become apparent from the specification, are accomplished according to the invention by driving the circulating pump by means of an electromotor which has a steplessly variable rpm and a regulator, for regulating the rpm of the electromotor which utilizes, as output magnitudes, voltage values which are, at least in their low range, up to 60% higher than those voltage values which correspond to the given characteristic of the circulating pump.

By utilizing an electromotor having a steplessly variable rpm as the drive for the circulating pump a continuous adaptation of the output of the pump to the momentary operational conditions of the heating system is ensured. The regulator regulates the rpm of the electromotor as a function of the previously calculated characteristic of the circulating pump which corresponds to the given data of the heating system. In order to ensure that in each operational condition of the heating system a sufficient supply with hot water is provided, the regulator delivers, at least in the lower voltage range, that is, at low flow velocity in the pipe system, voltage values which are above the voltage values of the characteristic curve. In this voltage zone, the circulating pump would operate with low rpm and correspondingly, with low output since, due to the low flow velocity, no higher output would be required. If then additional consumer apparatus are switched on and a higher output of the pump is instantly needed, the circulating pump may respond very slowly or not at all, in the case where the flow velocity increase is very slight. Such risks of defective operation cannot occur in the process according to the invention because the regulator, at least in the critical range, delivers higher voltage values. Thus, the circulating pump is given a higher value than actually required by the corresponding flow rate, so that even in the case of smaller flow velocities the pump output does not drop excessively. Therefore, upon switching on additional consumer apparatus, the flow velocity of the heating medium immediately increases and thus the circulating pump sets itself rapidly to the required output.

DESCRIPTION OF THE PREFERRED EMBODIMENTS

Figure 1:
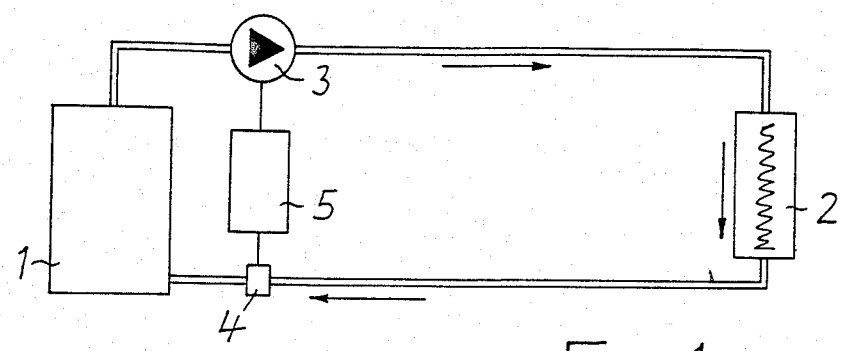
FIG. 1 is a block diagram of a heating system operated according to the invention.

In FIG. 1, there is illustrated a water heater 1 situated in a building, and a pipe system in the building which couples consumer devices 2 to the water heater. In FIG. 1 there is illustrated a single consumer apparatus 2 which, for the purpose of this description, represents a desired number of consumer devices. The water of the heating system is, driven by a circulating pump (hereafter referred to simply as "pump") 3, in the direction shown by the arrows, through the consumer apparatus 2 back to the water heater 1. The pump 3 is driven by an electromotor (not shown) whose rpm may be varied in a stepless manner.

A measuring device 4 is installed in the return pipe of the system which determines the flow velocity of the returning water and transmits a proportionate electric d.c. voltage to a regulator 5. Such a location for the measuring device is found to be the most favorable to enhance the efficiency of the system. However, it is feasible to instead place the measuring device in the output pressure pipe. Such measuring devices are known; they operate, for example, on the principle of ultrasound. The measuring device 4 may deliver, a d.c. voltage up to 10 volts which corresponds to the maximum flow velocity of the water in the return pipe when all the consumer apparatus 2 within the system are operating at their maximum potential. In this case, the water quantity corresponds to 100%. Therefore, when the water quantity and thus also the flow velocity drops by 10%, the d.c. voltage delivered by the measuring device 4 to the regulator 5 also drops by 10%, or by 1 volt. The measuring device 4 is connected with the regulator 5 whose output is, in turn, coupled with the electromotor of the pump 3. A conventional frequency converter may be inserted between the regulator 5 and the electromotor of the pump 3 such that the rpm of the electromotor is regulated as a function of the voltage delivered by the regulator 5.

Figure 2:
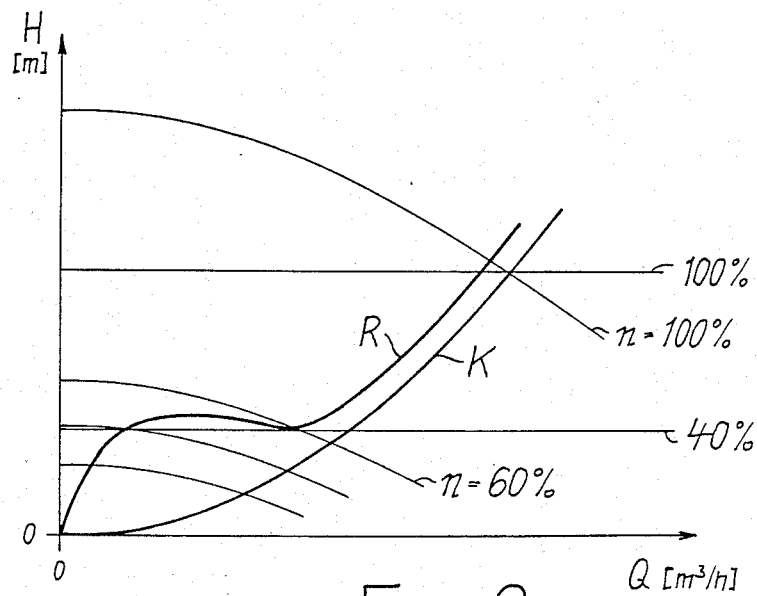
FIGS. 2 and 3 are diagrammatic views of graphs illustrating the performance of the method with analog regulation.
Figure 3:
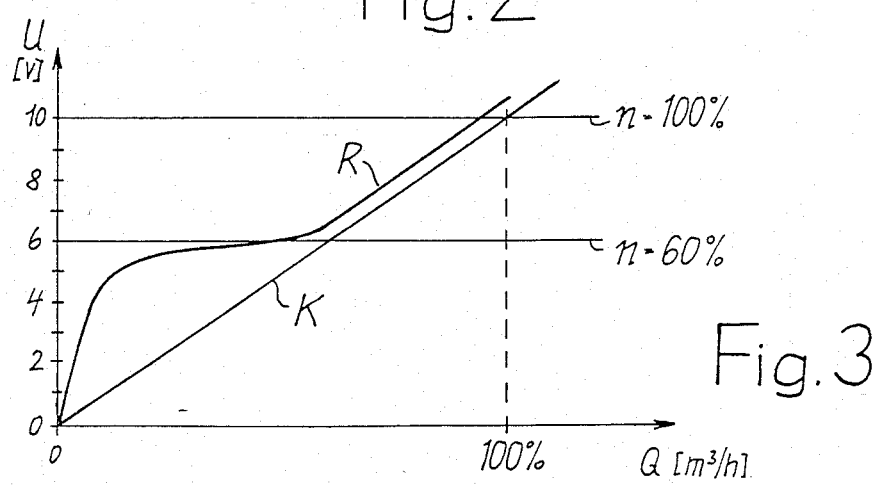
Figure 4:
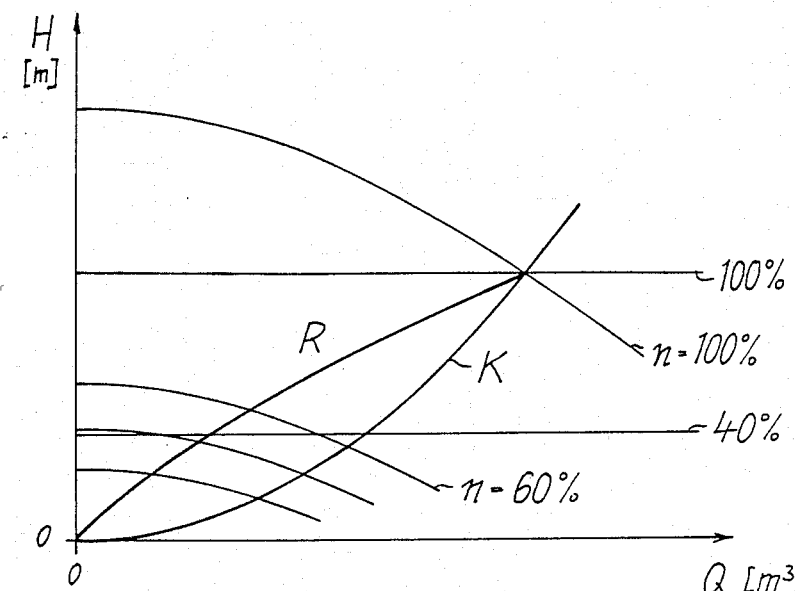
FIGS. 4 and 5 are diagrammatic views of graphs illustrating the performance of the method according to the invention by means of a computer-controlled regulator.
Figure 5:
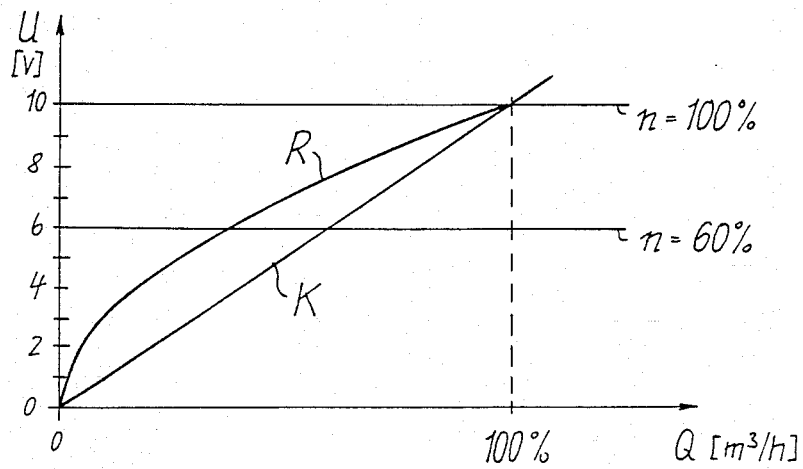

The pump 3 has a characteristic curve K as illustrated in FIGS. 2 and 4. Such a characteristic curve is known. Its course is representative of the size or output of the pump 3 which is selected in accordance with the parameters of the heating system, such as size and number of consumer apparatus. The voltage values corresponding to the characteristic curve K and illustrated in FIGS. 3 and 5 are supplied to the regulator 5. The pump delivers as a function of its rpm n, in accordance with the characteristic curve K, a predetermined water quantity Q up to a determined delivery height H as shown in FIG. 2. The momentary rpm n of the pump 3 corresponds to a determined voltage U. In the selected embodiment the maximum voltage U delivered by the regulator 5 is 10 volts. It corresponds to the maximum rpm of the pump 3 thus, n=100%. This rpm (output) of the pump 3 is required if all or substantially all the consumer apparatus 2 of the heating system are switched on and all must be supplied with hot water. The flow velocity of the water in the return pipe of the heating system is, in such a case, very high so that the measuring device 4 delivers the maximum voltage U=10 volts.

Subsequently, if the majority of consumer devices 2 in the heating system are switched off, the flow velocity of the water drops in the return pipe. For example, if the voltage transmitted by the measuring device 4 drops to 1 volt, the rpm of the pump 3 will be reduced to 10% of the maximum rpm. The pump 3 then operates approximately in the horizontal range of the pump characteristic curve K as shown in FIG. 2.

If in such an operational state of the heating system some of the consumer devices 2 are switched on, the flow velocity will slightly increase in the return pipe. Such an increase, however, particularly in large heating systems, is not sufficient to bring the pump 3 to the required output.

The above-noted disadvantage is eliminated by the process according to the invention in the following manner:

The regulator 5 delivers voltage values, which at least in the range of the lower flow velocities, are above the voltage values of the characteristic curve K. Or, stated differently, the voltage delivered by the regulator 5 is, at least for low flow velocities, higher than a normal regulator voltage that would—as a function of the flow velocity—generate a pump rpm and thus a pump output according to the characteristic curve of the pump. In a preferred embodiment the voltage values delivered by the regulator 5 at each flow velocity are higher than those on the characteristic curve K. In this manner a characteristic curve R as shown in FIGS. 2 and 3 is obtained which is situated above the characteristic curve K. In this manner the regulator 5, particularly in the lower voltage ranges, presets voltage values which provide a higher flow velocity than is actually required. The rpm (output) of the pump therefore never drops to an excessively low value. Therefore, when a small number of consumer devices are on, requiring a very small flow velocity and additional consumer devices are switched on, the required higher output of the pump 3 is immediately available.

Additionally, the method of operating the pump with the characteristic curve R is also beneficial when the pump is entirely brought to a standstill. By virtue of the relatively rapid rise of the characteristic curve R the pump 3 immediately assumes a high speed in a reliable and rapid manner upon switching on the consumer devices 2.

The distance of the characteristic curves K and R from one another is selected to be relatively large especially in the lower voltage range as is shown in FIGS. 2 and 3. Thus, when the characteristic curve R is at n=40–50%, the curve passes over to a substantially horizontal branch so that the rpm never drops under 40–50% of the maximum value even in the case of small flow velocities. In this manner, a sufficient supply of water to all consumer devices 2 during all operating conditions of the heating systems may be reliably ensured.

It is of importance in the method according to the invention as described above that the characteristic curve R is situated above the characteristic curve K in the lower voltage range. This applies up to approximately 50% of the maximum voltage U or the rpm n of the pump 3. At higher voltage values the characteristic curve R may also lie above the characteristic curve K as shown in FIGS. 2-5. This, however, is not essential since in this higher range the rpm of the pump 3 is by itself sufficiently high. The distance between the two characteristic curves R and K should therefore be in the lower voltage range significantly greater than at higher voltages.

FIGS. 2 and 3 illustrate a possible course of the characteristic curve R in which at approximately 40% of the output, that is the delivery height H, the output or rpm of the pump 3 remains approximately constant. The characteristic curves R have a steep slope, starting at zero up to that 40% value. A better regulating behavior with additional energy saving is obtained if the characteristic curves have a course as shown in FIGS. 4 and 5. In these examples the slope is not as steep and the course of the characteristic curves are more uniform. The characteristic curves of FIGS. 4 and 5 may be adhered to in a very simple manner if the regulator 5 is controlled by a computer equipped with a microprocessor. In up-to-date regulating technology it is feasible to operate the system according to the characteristic curves of FIGS. 4 and 5 with an analog regulator. In all cases the characteristic curve R lies above the characteristic curve K; the distance between the two curves is significant in the low voltage range.

As it has been discussed above, the measuring device 4 is expediently mounted in the return pipe of the pipe network of the heating system. At this location the flow of the water is the most uniform and temperature fluctuations are the smallest. The obtained measuring values therefore are particularly accurate.

In heating systems where the consumer devices 2 are equipped with thermostatic valves and operate with an automatic temperature lowering at night, it is preferred to limit the output of the pump 3 during the duration of such nighttime reduction. Such a step may be taken by the regulator 5 itself, which, during the nighttime reduction, may deliver as an upper voltage value, 40-50% of the maximum voltage.

The present disclosure relates to subject matter contained in Federal Republic of Germany Patent Application No. P 37 02 569.4 (filed Jan. 29th, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. A method of setting the output of a circulating pump installed in a hot water heating system and drivable by a variable rpm electromotor; said pump having a characteristic curve representing the pump output as a function of the pump rpm; comprising the steps of:

a) driving water by the pump from a water heater through a piping system to consumer devices situated in various locations served by the heating system;
b) returning the water to the water heater by way of a return pipe;
c) sensing the flow velocity of the water by a measuring device installed in the piping system;
d) obtaining from the measuring device a first voltage as a function of said flow velocity; said first voltage being in a voltage range representing a range of flow velocities of water in said heating system;
e) applying said first voltage to a regulator connected to the electromotor;
f) generating a second voltage by the regulator; said second voltage being, at least for a lower part of said voltage range, higher than a normal regulator output voltage that would, as a function of said first voltage, generate a pump rpm resulting in a pump output according to said characteristic curve; and
g) steplessly varying the rpm of the electromotor as a function of said second voltage of the regulator.

2. A method as defined in claim 1, wherein values of said second voltage generated by the regulator, are for each flow velocity of the water, higher than corresponding values of said normal regulator output voltage, and the difference between said values of said second voltage and corresponding values of said normal regulator output voltage is greater at lower flow velocities than at higher flow velocities.

3. A method as defined in claim 1, further comprising the step of maintaining the values of said second voltage for low flow velocities at a substantially constant value of approximately 50% of a maximum value of said second voltage.

4. A method as defined in claim 1, further comprising the step of using, as the regulator, a computer having a microprocessor.

5. A method as defined in claim 1, wherein the step of applying said first voltage to the regulator includes applying voltage values which correspond to the pump characteristic curve.

6. A method as defined in claim 1, further comprising the step of limiting the rpm of the circulating pump during a night reduction period in the heating system when said heating system includes thermostat controlled valves at the consumer devices for automatic nighttime reduction of heating temperatures.

7. A method as defined in claim 1, wherein said second voltage is up to 60% more than said normal regulator output voltage.

8. A method as defined in claim 1, wherein said measuring device is installed in a return pipe of the piping system for performing said sensing step.

* * * * *